United States Patent [19]

Wurl

[11] Patent Number: 5,048,999

[45] Date of Patent: Sep. 17, 1991

[54] CLAMPED CONNECTION BETWEEN A PROFILE PART AND A SHEET METAL PART BY MEANS OF A CLAMPING STRIP

[75] Inventor: Willi Wurl, Niefern-Oeschelbronn, Fed. Rep. of Germany

[73] Assignee: Dr. Ing. H.C.F. Porsche Aktiengesellschaft, Fed. Rep. of Germany

[21] Appl. No.: 679,102

[22] Filed: Apr. 2, 1991

[30] Foreign Application Priority Data

Apr. 6, 1990 [DE] Fed. Rep. of Germany ....... 4011237

[51] Int. Cl.⁵ .............................................. B25G 3/20
[52] U.S. Cl. .................................. 403/374; 403/409.1; 403/24
[58] Field of Search ...................... 403/374, 409.1, 24; 160/392

[56] References Cited

U.S. PATENT DOCUMENTS 2,020,986 11/1935 Anoschenko .................. 403/374 X
4,234,035 11/1980 Babbs ................................ 160/392

FOREIGN PATENT DOCUMENTS 2358257 2/1975 Fed. Rep. of Germany ...... 403/374

Primary Examiner—Andrew V. Kundrat
Attorney, Agent, or Firm—Evenson, Wands, Edwards, Lenahan & McKeown

[57] ABSTRACT

A clamped connection between a profile part and a sheet metal part by mans of a clamping strip. An edge area of the sheet metal part is held in its position between a foot portion of the clamping strip and a receiving device of the profile part and rests on an angular portion of the receiving device. An edge area of the sheet metal part, which projects into the receiving device and has a rectangular construction, is fixed in the receiving device by means of the clamping strip having an approximately T-shaped cross-section, the wedge-shaped foot portion of the clamping strip having at least one detent which interacts with an undercut area of the receiving device. Holding lips of a head portion of the clamping strip interact with the sheet metal part and the profile part in a supporting manner.

12 Claims, 3 Drawing Sheets

CLAMPED CONNECTION BETWEEN A PROFILE PART AND A SHEET METAL PART BY MEANS OF A CLAMPING STRIP

BACKGROUND AND SUMMARY OF THE INVENTION

The invention relates to a clamped connection between a profile part and a sheet metal part by means of a clamping strip.

A clamped connection of this generic type is disclosed in Austrian Patent Document AT-PS 370 370, wherein a U-shaped or V-shaped edge area of the sheet metal part is inserted into a corresponding receptacle of the profile part, and is held in position by a clamping strip. The clamping strip, which interacts with the profile part by way of a detent connection, has a molded-on part which corresponds in shape to the edge area of the sheet metal part.

In order to provide an effective clamped connection, the receiving device, the edge area of the sheet metal part and the molded-on part of the profile part as well as the components of the detent connection must be carefully coordinated with one another. The U-shaped or V-shaped edge area of the sheet metal part is difficult to manufacture, and takes up a relatively large amount of space. Since only the edge area of the sheet metal part interacts with the clamping strip, a clamped connection between the receptacle, the sheet metal part and the clamping strip exists only at one point so that a tilting movement of the sheet metal part may occur.

It is therefore an object of the invention to further develop a clamped connection between a profile part and a sheet metal part by means of a clamping strip which is simple, effective, avoids tilting movements of the sheet metal part, and allows for compensation of tolerances in a simple manner.

According to the invention, this object is achieved by means of two holding lips, which extend approximately at a right angle to the wedge-shaped foot portion of the clamping strip. In this manner, a tilting movement of the sheet metal part is avoided, and only a defined lateral expansion of the receptacle is permitted during insertion of the clamping strip so that there is always an operationally appropriate clamped connection. The individual parts of the clamped connection can be manufactured in a simple and low-cost manner.

The principal advantages achieved by the invention are that, by means of the end area of the sheet metal part which is bent away approximately at a right angle, and the approximately T-shaped construction of the clamping strip, a clamped connection is provided which, while it requires little space, has a simple construction, in which case tolerances can be compensated in a simple manner.

Other objects, advantages and novel features of the present invention will become apparent from the following detailed description of the invention when considered in conjunction with the accompanying drawings.

DETAILED DESCRIPTION OF THE DRAWINGS

Figure 2:
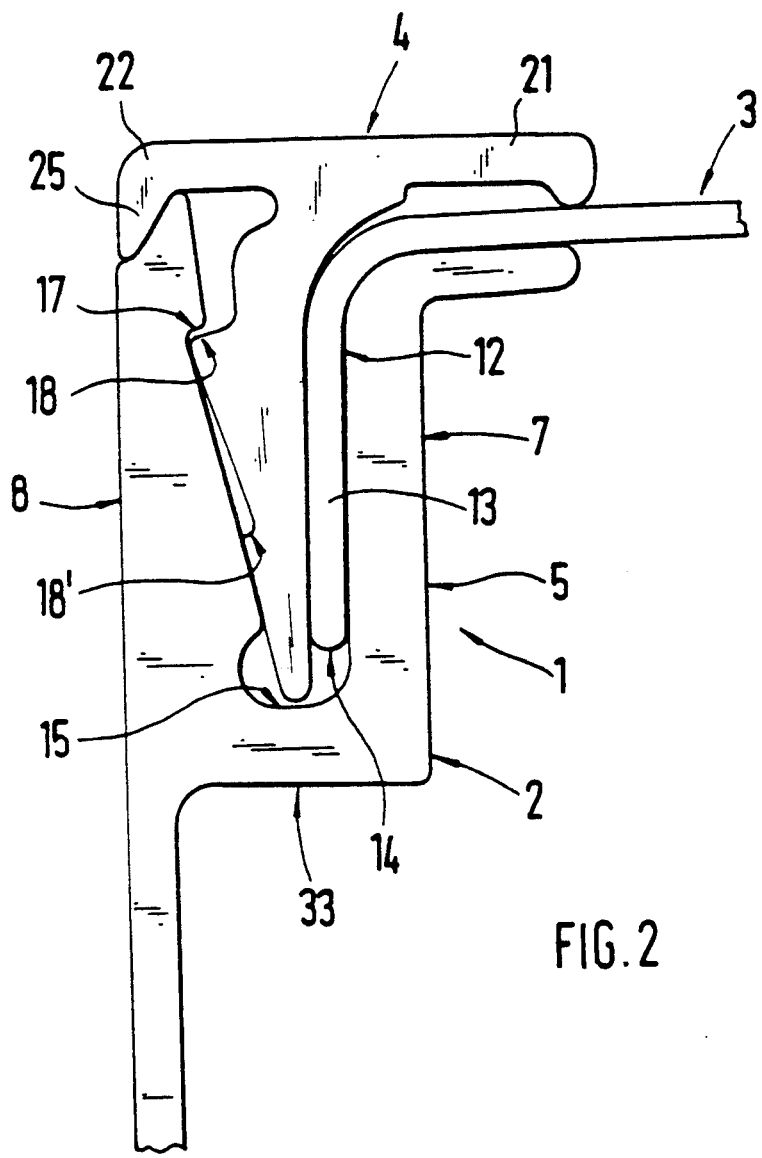
FIG. 2 is an enlarged detail view of a portion of the apparatus designated as X in FIG. 1.
Figure 4:
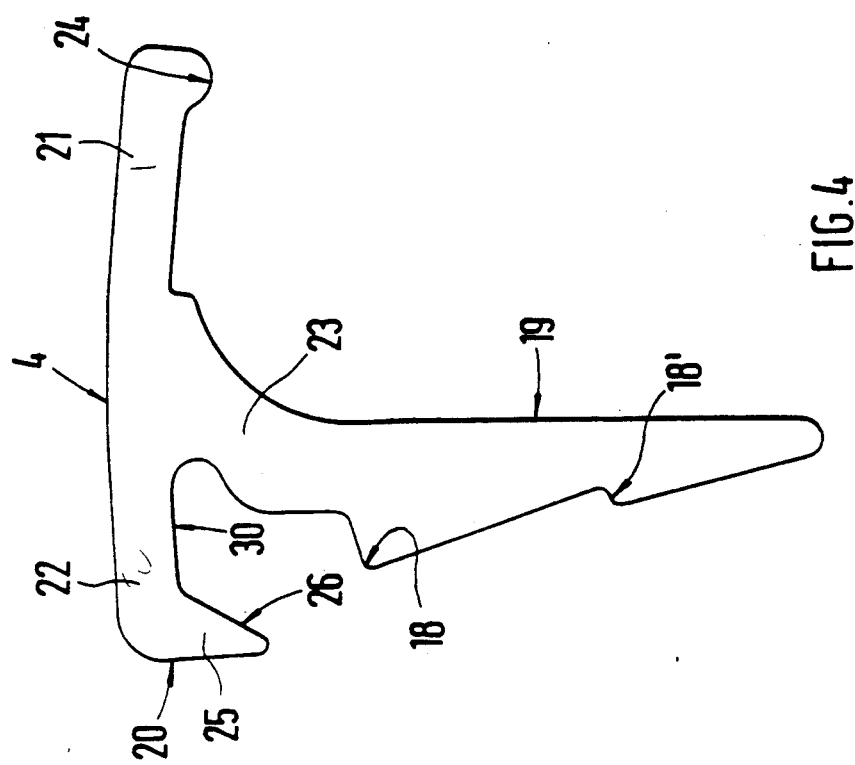
FIG. 4 is a cross-sectional view of the clamping strip of the clamped connection in the delivered state.

FIG. 2 illustrates a clamped connection between a profile part 2 and a sheet metal part 3 by means of a clamping strip 4. The oblong profile part 2 preferably is manufactured by the extrusion method from light metal. At an upper end area, it has a cross-sectional widening 5 with an approximately wedge-shaped receptacle 6 which is open toward the top and is bounded by two lateral webs 7, 8 and a lower connecting piece 9.

Figure 3:
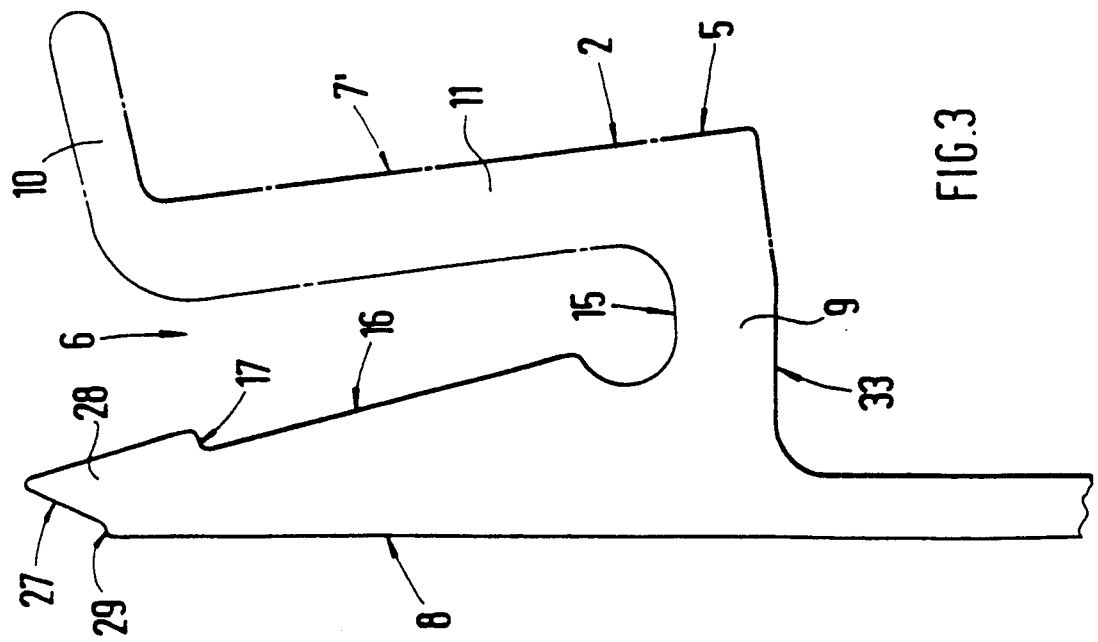
FIG. 3 is a cross-sectional view of the profile part of the clamped connection in the delivered state.

The one web 7 has an approximately L-shaped profile, with the shorter leg 10 extending away from the upper free end of the upright leg 11 and projecting toward the outside at approximately a right angle. A bent edge area 12 of the sheet metal part also made of light metal rests on the L-shaped web 7 of the profile part 2, specifically on the side facing the receptacle 6. This end area is held in its position by means of the clamping strip 4. The flange 13 of the sheet metal part 3, which is bent away at the end side, has a shorter length than the height dimension of the receptacle 6 so that the flange end 14 does not extend to the bottom 15 of the receptacle. In the delivered state, the web 7 takes up the inwardly bent position 7' indicated by a dash-dotted line (FIG. 3).

The other, upright-aligned web 8 tapers continuously toward the top and, on the side facing the receptacle 6, has an oblique contact surface 16 extending from the bottom 15 toward the top, at which locally a step-shaped area 17 is provided which interacts with detents 18 and 18' of a foot portion 19 of the clamping strip 4. The area 17 which forms an undercut is arranged approximately at the level of the shorter leg 10 of the web 7.

The clamping strip 4 has an approximately T-shaped cross-section and comprises a foot portion 19 adapted to be inserted into the receptacle 6 and a head portion 20 disposed essentially above the receptacle 6, the head portion 20 comprising two holding lips 21, 22. One holding lip 21 is locally supported on the exterior side of the sheet metal part 3, whereas the other holding lip 11 interacts with the profile part 2.

On the side facing the web 8, the wedge-shaped foot portion 19 is provided with two detents 18, 18' disposed above one another. A first detent 18' is situated toward the bottom of the wedge-shaped foot, defining a predetent position; and a second detent 18 is situated toward the top, defining a main detent position of the clamping strip 4. Above the second detent 18, a bent transition area 23 is formed between the foot portion 19 and the two holding lips 21, 22 of the clamping strip 4. The holding lips 21, 22 extend on both sides of the foot portion 19 and are aligned approximately at a right angle with respect to the foot portion 19. On its free end on the side facing the sheet metal part 3, one holding lip 21 has an approximately semicircular cross-sectional widening 24 which under prestress rests on the exterior side of the sheet metal part 3. The shorter leg 10 of the L-shaped web 7 of the receptacle 6 disposed on the bottom also extends under prestress with respect to the sheet metal part 3 disposed above it.

At its free exterior end, the other holding lip 22 has a downwardly directed triangular molded-on part 25 which interacts with an upper end area 28 of the web 8 of the profile part 2 so that only a defined lateral expansion of the profile part 2 is possible. An obliquely directed inner contact surface 26 of the molded-on part 25 rests on a corresponding exterior surface 27 of the end area 28. A lower end of the molded-on part 25 extends approximately to a horizontal projection 29 of the profile part 2. Viewed in the perpendicular direction, the upper end area 28 of the profile part 2 extends up to a lower boundary surface 30 of the holding lip 22. In the delivered condition, the two webs 7, 8 of the profile part 2 are directed inward (under prestress) and, when the clamping strip 4 is inserted, are pressed toward the outside. However, it is also possible that only one of the two webs, for example, 7' of the profile part 2 is prestressed with respect to the sheet metal part or to the clamping strip 4.

Figure 1:
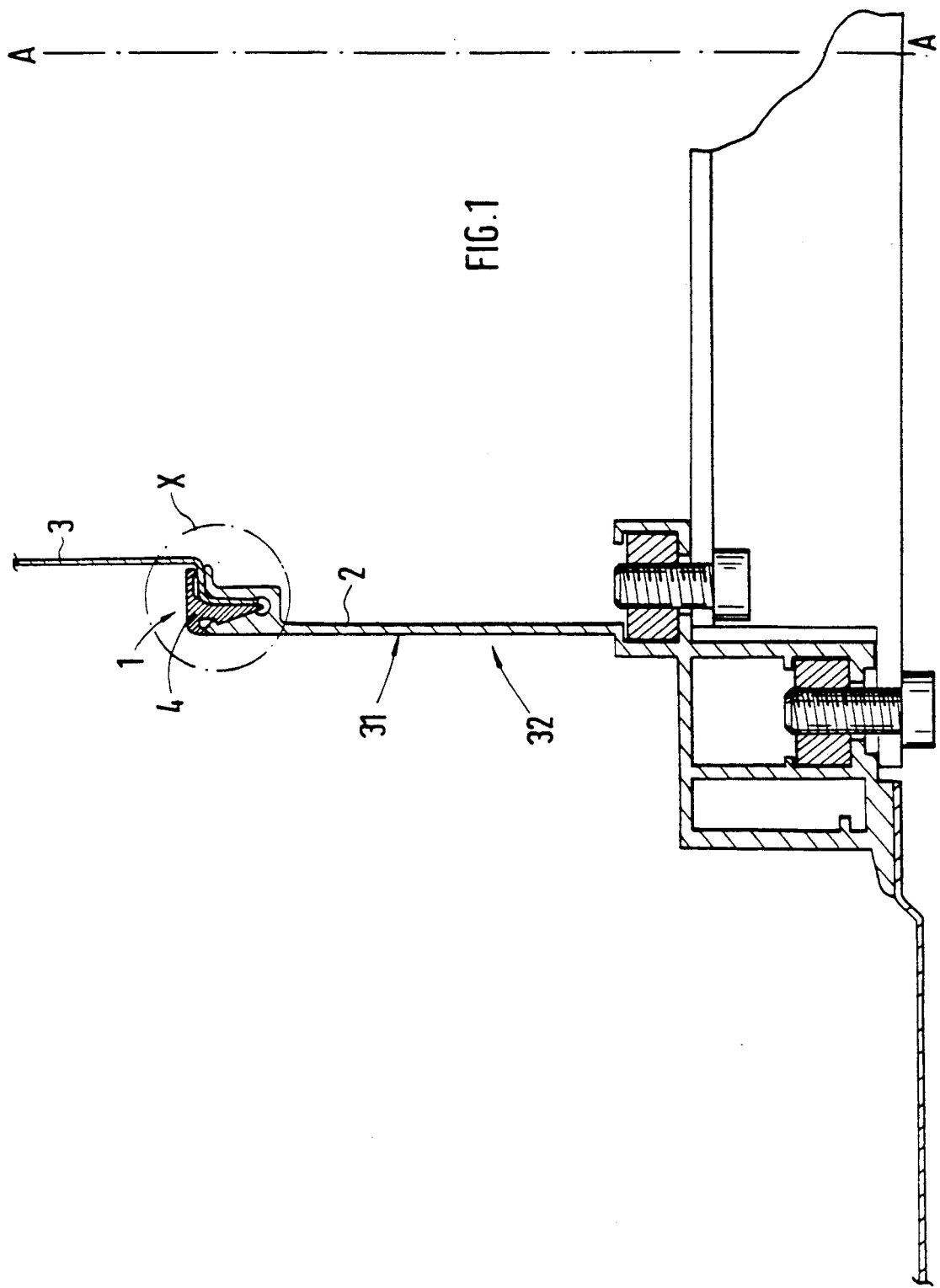
FIG. 1 is a vertical sectional view of a floor system of a vehicle body structure.

The mounting of the clamping strip 4 is performed by means of a pressing tool. For this purpose, a horizontal bearing surface 33 of the lower connecting piece 9 of the receptacle 6 rests on a pressing tool (not shown). The clamping strip 4 is manually inserted in the receptacle 6 by means of a die acting from above, and is moved from the predetent position into the main detent position so that an effective clamped connection 1 exists along the whole longitudinal course of the sheet metal part 3 and of the receptacle 6. When the clamping strip 4 is inserted, a small gap is provided between the widened bottom 15 of the receiving device and the lower end of the foot portion 19 in order to prevent an excessively deep insertion. In addition to the clamped connection 1, an adhesive connection may also be provided between the profile part 2, the clamping strip 4 and the sheet metal part 3. For this purpose, before the sheet metal part 3 is placed inside and the clamping strip 4 is inserted, an adhesive body (not shown) is inserted into the widened bottom 15 of the receptacle 6. In the embodiment, the profile part 2 and the sheet metal part 3 form sections of a transmission tunnel 31 of the vehicle body structure 32. (See FIG. 1.) Naturally, the clamped connection 1 according to the invention may also be used at other points of a vehicle body structure 32.

Although the invention has been described and illustrated in detail, it is to be clearly understood that the same is by way of illustration and example, and is not to be taken by way of limitation. The spirit and scope of the present invention are to be limited only by the terms of the appended claims.

I CLAIM:

1. A Clamped connection between a profile part and a sheet metal part by means of a clamping strip, an edge area of the sheet metal part being clamped in between a foot portion of the clamping strip and a receptacle of the profile part, and resting on an angular portion of the receptacle, wherein the edge area of the sheet metal part, which projects into the receptacle and has a rectangular design, is held in the receptacle by means of a clamping strip having an approximately T-shaped cross-section, the foot portion of the clamping strip being wedge shaped, and having at least one detent which interacts with an undercut area of the receptacle, and wherein first and second holding lips of a head section of the clamping strip extend approximately at a right angle with respect to the foot portion, said first holding lip being supported on the sheet metal part, and said second holding lip being supported on profile part.

2. A clamped connection according to claim 1, wherein the receptacle on the profile part has a wedge-shaped cross-section with a widened bottom portion.

3. A clamped connection according to claim 1, wherein the receptacle is formed by a first web, which is profiled approximately in an L-shape, and a second web containing the undercut area.

4. A clamped connection according to claim 3, wherein the approximately rectangular edge area of the sheet metal part rests on the first web with the L-shaped profile.

5. A clamped connection according to claim 4, wherein the said second holding lip has, at its free end, a downwardly directed molded-on part which interacts with an upper end area of the second web to limit the lateral expansion of the receptacle when the clamping strip is inserted therein.

6. A clamped connection according to claim 5, wherein the sheet metal part is received between said first holding lip of the head portion and a shorter leg of the first web with the L-shaped profile, said first holding lip as well as said shorter leg being prestressed with respect to the sheet metal part.

7. A clamped connection according to claim 6, wherein the foot portion of the clamping strip has two detents arranged above one another, a lower detent defining a predetent position, and an upper detent defining a main detent position.

8. A clamped connection according to claim 1, wherein a substantially planar bearing surface for a pressing tool is constructed on the profile part below the receiving device.

9. A clamped connection according to claim 1, wherein the profile part is formed by an extruded profile which is preferably manufactured of light metal.

10. A clamped connection according to claim 9, wherein the profile part, the clamping strip and the sheet metal part are preferably manufactured of light metal.

11. A clamped connection according to claim 1, wherein when the clamping strip is inserted into the receptacle, a small gap is provided between a bottom portion of the receptacle and a lower end of the foot portion.

12. A clamped connection according to claim 5, wherein the downwardly directed molded-on part of said second holding lip has an inner, obliquely directed contact surface which rests on a corresponding surface of an upper end area of the second web, when the clamping strip is mounted.

* * * * *